US012098832B1

(12) United States Patent
Wang

(10) Patent No.: US 12,098,832 B1
(45) Date of Patent: Sep. 24, 2024

(54) LAMP HEAD FOR CHRISTMAS LIGHT

(71) Applicant: Xin Wang, Zhejiang (CN)

(72) Inventor: Xin Wang, Zhejiang (CN)

( * ) Notice: Subject to any disclaimer, the term of this patent is extended or adjusted under 35 U.S.C. 154(b) by 0 days.

(21) Appl. No.: 18/468,076

(22) Filed: Sep. 15, 2023

(30) Foreign Application Priority Data

Aug. 21, 2023 (CN) ......................... 202322259097.5

(51) Int. Cl.
*F21V 23/06* (2006.01)
*F21S 4/10* (2016.01)
*F21V 23/00* (2015.01)

(52) U.S. Cl.
CPC ................ *F21V 23/06* (2013.01); *F21S 4/10* (2016.01); *F21V 23/002* (2013.01)

(58) Field of Classification Search
CPC ........... F21V 23/002; F21V 23/06; F21S 4/10
See application file for complete search history.

(56) References Cited

U.S. PATENT DOCUMENTS

2005/0086801 A1* 4/2005 Liu ........................... F21K 9/00 29/829
2017/0051880 A1* 2/2017 Joye ........................ F21V 23/02
2021/0356110 A1* 11/2021 Zhang ................. F21V 19/0055

OTHER PUBLICATIONS

Innovation Q+ NPL Search (Year: 2024).*

* cited by examiner

*Primary Examiner* — Anabel Ton

(57) ABSTRACT

A lamp head for a Christmas light including: a lamp head shell, defining a mounting hole for an external wire to pass through; a light-emitting inner-core assembly, including a light-transmitting lampshade, a patch lamp board, and a fixing seat; wherein an end of the light-transmitting lampshade is connected to the fixing seat, and the patch lamp board is arranged inside the light-transmitting lampshade; the light-transmitting lampshade is filled with a potting adhesive; the patch lamp board is arranged with two leads, and the two leads pass through the potting adhesive and are threaded out from the fixing seat; the fixing seat is inserted and connected in the mounting hole, and the two leads are electrically connected to the external wire.

9 Claims, 7 Drawing Sheets

LAMP HEAD FOR CHRISTMAS LIGHT

CROSS REFERENCE

The present disclosure claims priority of Chinese Patent Application No. 202322259097.5, filed on Aug. 21, 2023, the entire contents of which are hereby incorporated by reference in their entirety.

TECHNICAL FIELD

The present disclosure belongs to the technical field of lamps and lanterns, and particularly relates to a lamp head for a Christmas light.

BACKGROUND

Lamps are used in thousands of households for lighting, but also play a decorative role, which are vital to life. In important festivals, people will use Christmas lights as decorations to set the mood. The Christmas light is usually a string of lights formed by a number of lamps connected in series or parallel together, for hanging up.

Due to the large number of lamp heads on the Christmas light, the installation workload is large. In the related art, the lead on the lamp heads is welded to an external wire, and when part of the lamp heads is damaged, the part is inconvenient to remove and the only operable solution is to replace the whole Christmas light; or, a light-emitting inner-core assembly is screwed into the lamp head shell, and installation and removal are inconvenient. When the Christmas light is placed in the outdoor, snow and rain are easy to seep into the lamp head, while waterproof of the lamp head is poor, which results in a leakage of electricity or short-circuit with a potential safety hazard.

SUMMARY OF THE DISCLOSURE

The purpose of the present disclosure is to provide, in response to the above existing technical problems, a lamp head for a Christmas light. By filling the light-transmitting lampshade with the potting adhesive to waterproof the patch lamp board, the two leads on the patch lamp board pass out of the fixing seat, and the fixing seat is inserted and connected in the mounting hole of the lamp head shell, such that the installation is convenient and quick, and the internal waterproofing of the lamp head shell is realized. The present disclosure achieves the effect of waterproofing and easy installation.

A lamp head for a Christmas light, including:

a lamp head shell, defining a mounting hole for an external wire to pass through;

a light-emitting inner-core assembly, including a light-transmitting lampshade, a patch lamp board, and a fixing seat; wherein an end of the light-transmitting lampshade is connected to the fixing seat, and the patch lamp board is arranged inside the light-transmitting lampshade; the light-transmitting lampshade is filled with a potting adhesive; the patch lamp board is arranged with two leads, and the two leads pass through the potting adhesive and are threaded out from the fixing seat;

wherein the fixing seat is inserted and connected in the mounting hole, and the two leads are electrically connected to the external wire.

In some embodiments, the light-transmitting lampshade includes a closed light source scattering end and an open end for filling with the potting adhesive; the patch lamp board is arranged on an inner side of the light source scattering end; the patch lamp board defines a penetration hole, and a hot-melt column is arranged in the penetration hole and abuts against the inner side of the light source scattering end.

In some embodiments, the fixing seat includes a first socket portion, a second socket portion, and a mating portion that are disposed sequentially from top to bottom, and the mating portion is sleeved on the open end.

In some embodiments, the mounting hole includes a first chamber adapted to the first socket portion, and a second chamber adapted to the second socket portion.

In some embodiments, the first socket portion is in a flat structure, and the first socket portion is arranged with a first extension block and a second extension block for the two leads to individually pass through, the first extension block being disposed on a side of the first socket portion and the second extension block being disposed on another side of the first socket portion; one of the two leads is bent to an outer surface of the first extension block after passing through and along the first extension block, and the other of the two leads is bent to an outer surface of the second extension block after passing through and along the second extension block.

In some embodiments, a first limit slot is defined in the first chamber and is adapted to snap into place with the first socket portion, and a second limit slot is further defined in the first chamber and is disposed on each of both sides of the first limit slot; a conductive sheet is arranged in the second limit slot to be connected to the external wire, and the conductive sheet is configured to be electrically connected to a corresponding lead.

In some embodiments, a height H1 of the first extension block is greater than a height H2 of the second extension block.

In some embodiments, an avoidance slot on a same side as the second extension block is defined on an outer periphery of the second socket portion.

In some embodiments, the second socket portion has a ring-like structure, at least one positioning surface is arranged on an outer periphery of the second socket portion, and the second chamber defines a positioning groove adapted to each of the at least one positioning surface.

In some embodiments, a production process of the lamp head, including:

I. preparing the light-emitting inner-core assembly:

a, pre-injection molding the light-transmitting lampshade and the fixing seat, wherein the light-transmitting lampshade is made of PS material;

b. defining the penetration hole in a center of the patch lamp board and installing the hot-melt column;

c, placing the patch lamp board arranged with the hot-melt column inside a chamber of the light-transmitting lampshade, and making a peripheral edge of the patch lamp board in contact with a peripheral wall inside the chamber of the light-transmitting lampshade, and making an end of the hot-melt column in contact with an inner wall of the light source scattering end of the light-transmitting lampshade;

d, heating the hot-melt column by a heating gun, for making two ends of the heated hot-melt column hot-melt connected with the patch lamp plate and the light transmissive lampshade, respectively;

e, after cooling, aligning, by a filling equipment, a filling gun with the open end of the light-transmitting lampshade and injecting the filling adhesive, and leading the two leads on the patch lamp board out from the filling adhesive; and f, natural cooling and curing, assembling with the fixing seat; and II, pre-injection molding the lamp head shell, and installing the light-emitting inner-core assembly in the lamp head shell.

The beneficial effects of the present disclosure are as follows.

1. The light-transmitting lampshade is filled with potting adhesive, which can play a waterproof role for the patch lamp board, and the fixing seat is inserted and connected in the lamp head shell, which can also waterproof the leads in the fixing seat to avoid leakage and short circuit.
2. The conductive sheet is snapped in the first limit slot and the second limit slot in the lamp head shell, the lead is bent to the outer surfaces of the first extension block and the second extension block on the fixing seat, such that the fixing seat is directly inserted and connected in the lamp head shell to realize the conductive path, which leads to easy and fast installation.
3. The first extension block and the second extension block are of different heights, which is convenient to distinguish the positive and negative poles of the patch lamp board to avoid that connecting the wrong external lead causes the lamp head not to light up.

Figure 1:
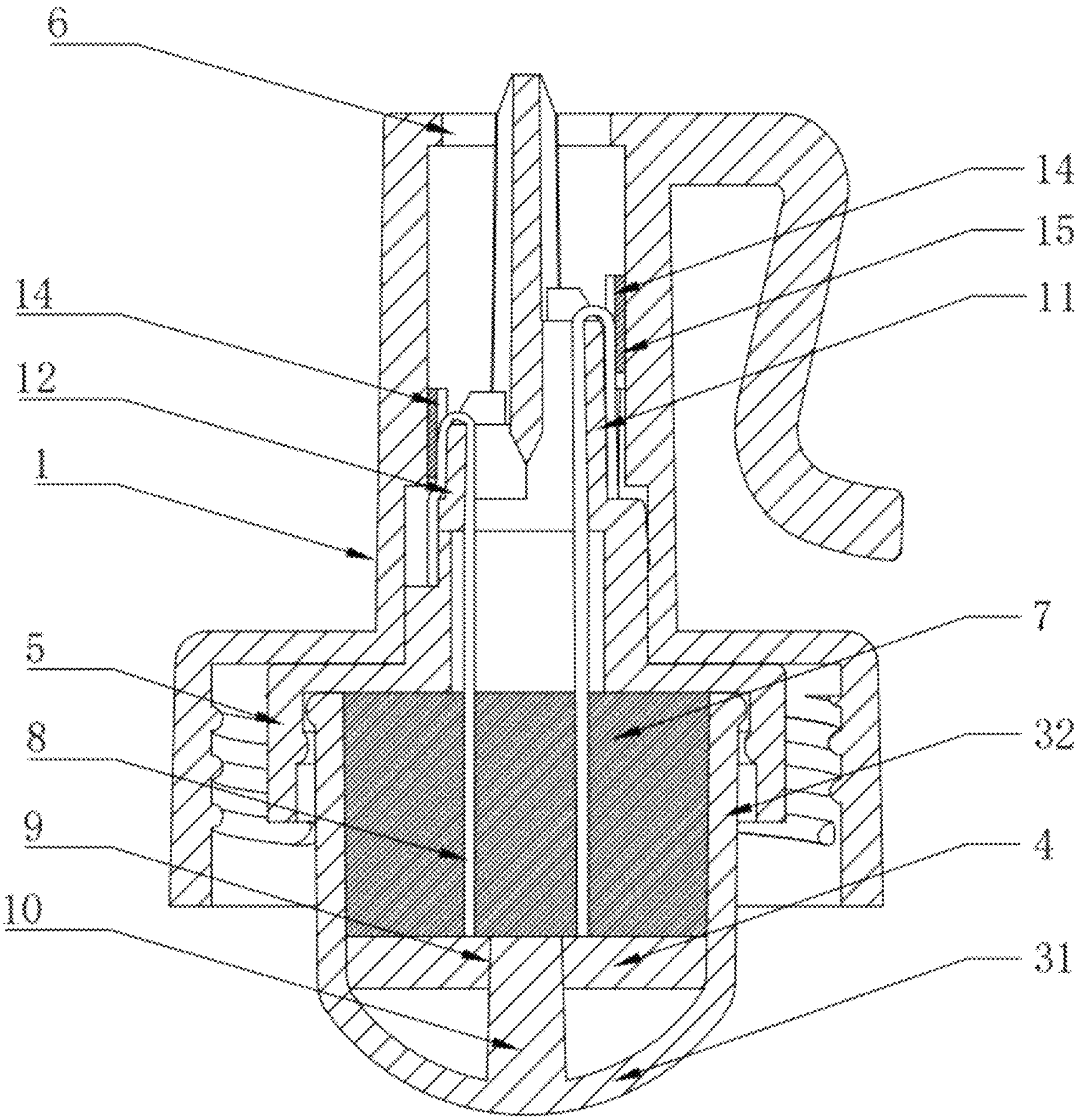
FIG. 1 is a cross-sectional structural schematic view according to the present disclosure.
Figure 2:
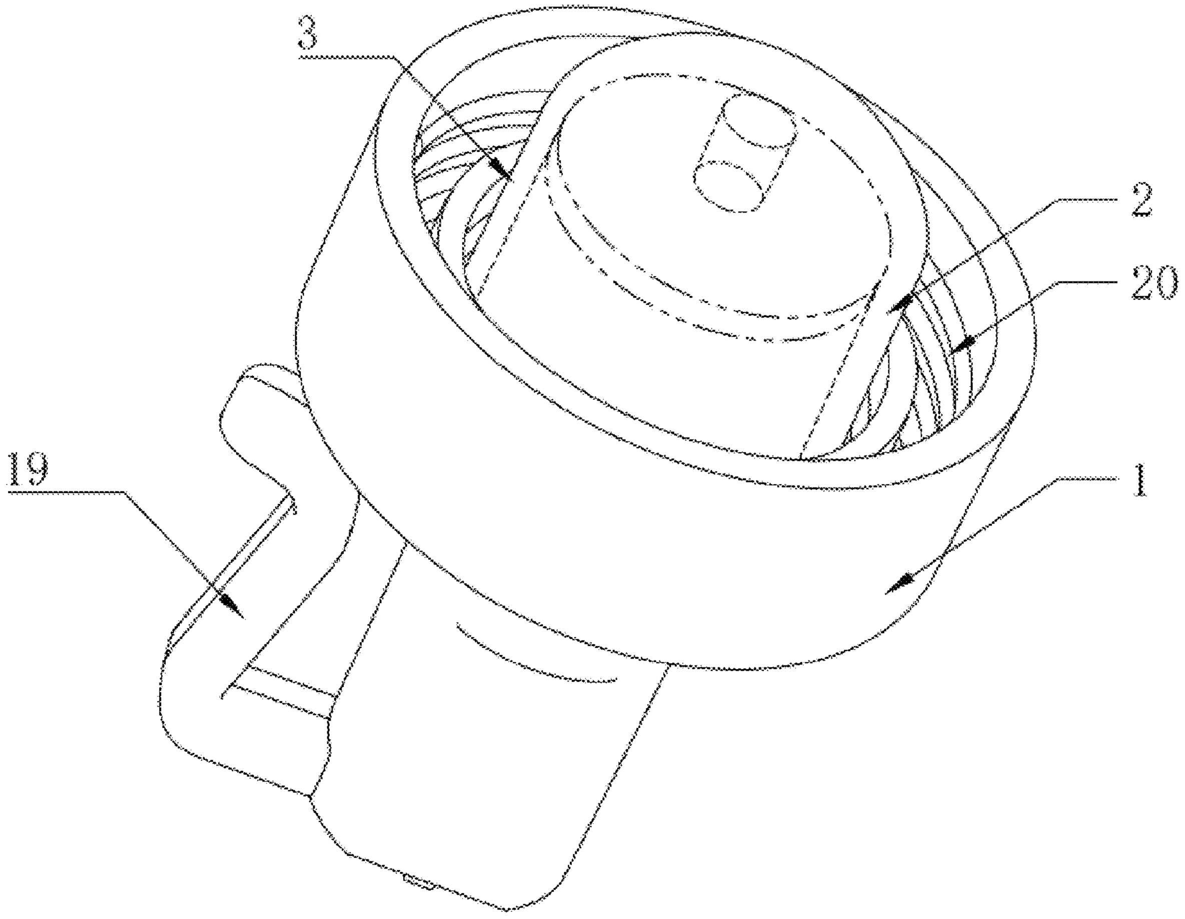
FIG. 2 is an entire structural schematic view according to the present disclosure.
Figure 3:
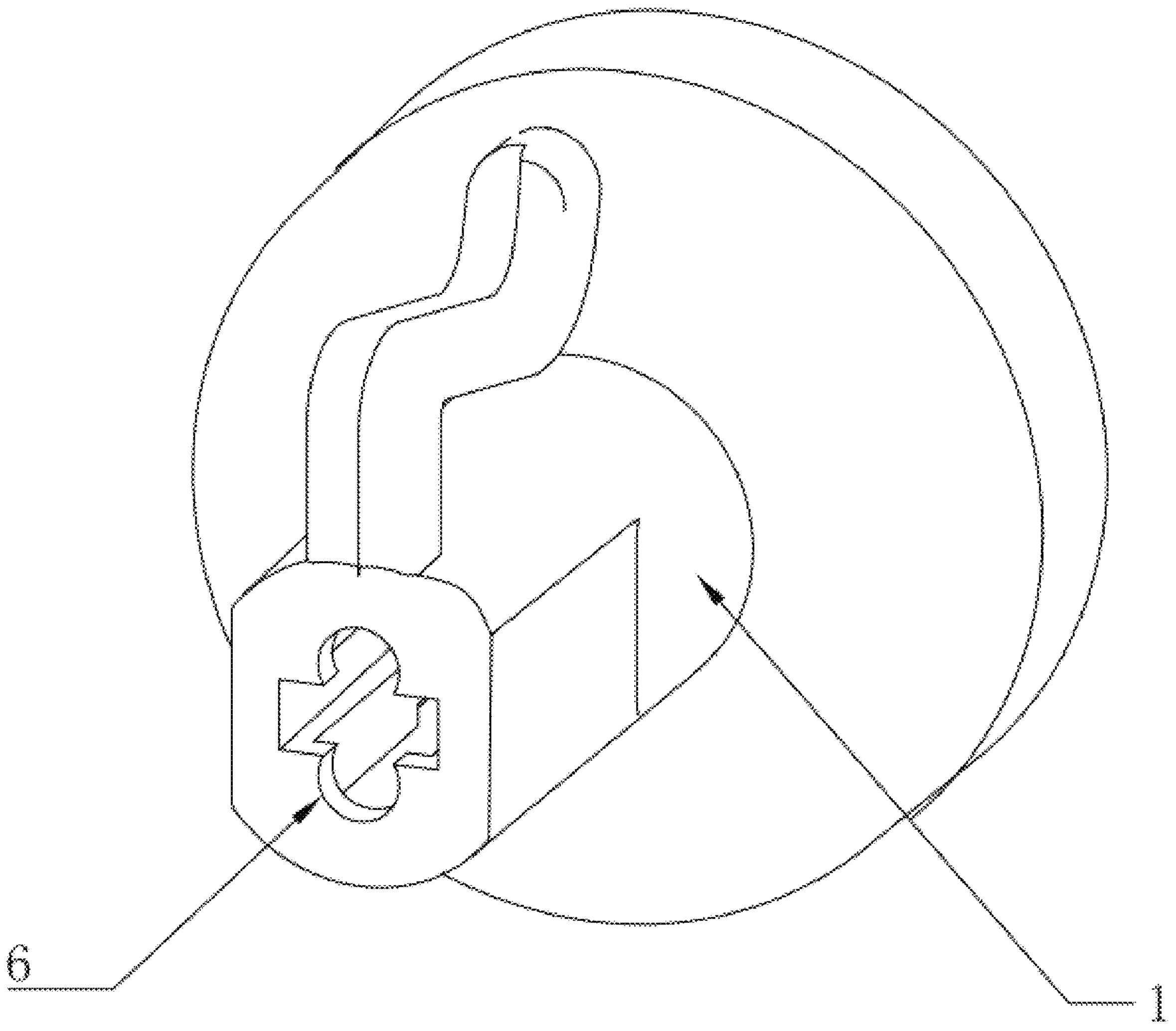
FIG. 3 is an entire structural schematic view of another viewing angle according to the present disclosure.
Figure 4:
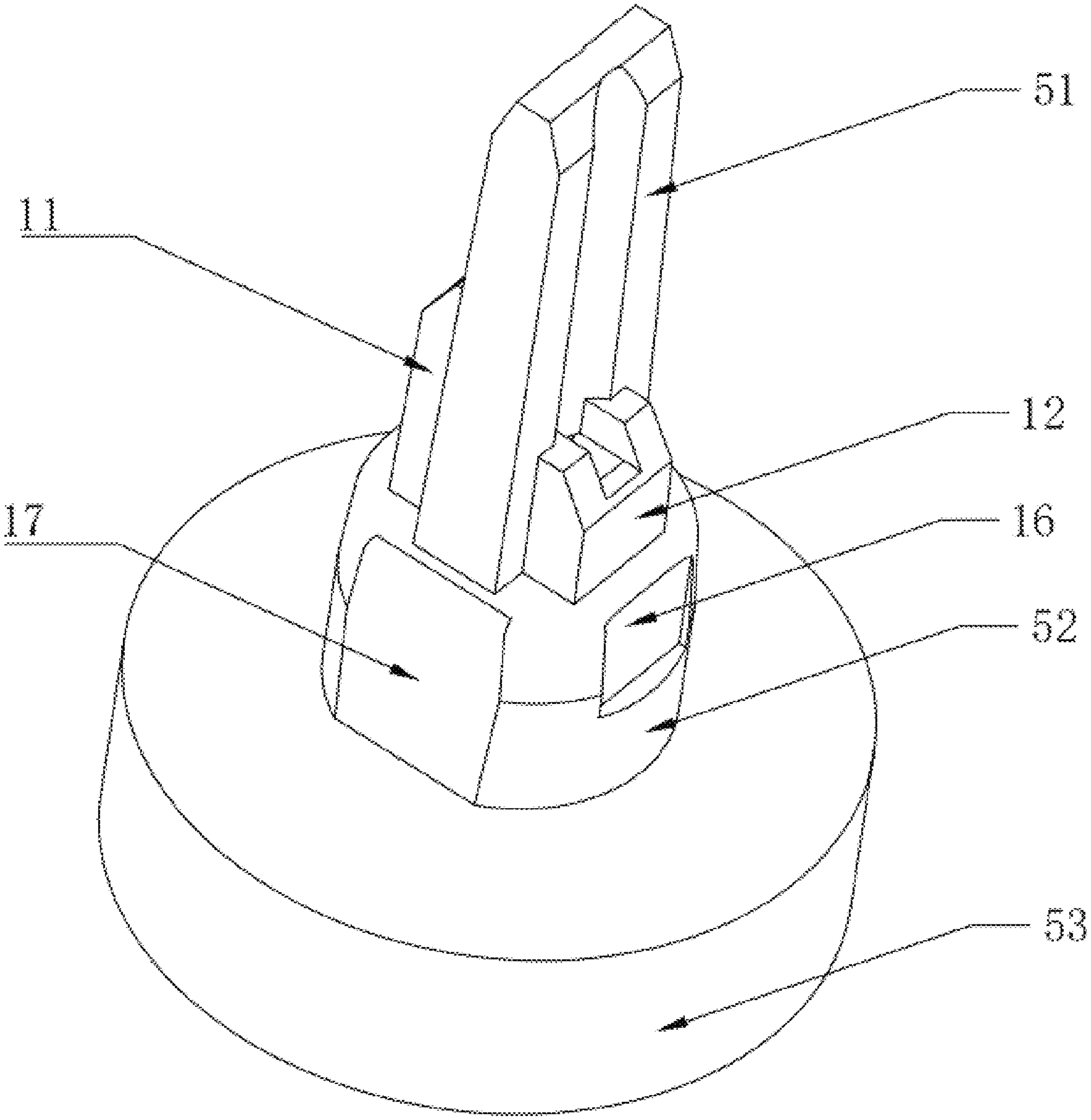
FIG. 4 is a structural schematic view of a fixing seat according to the present disclosure.
Figure 5:
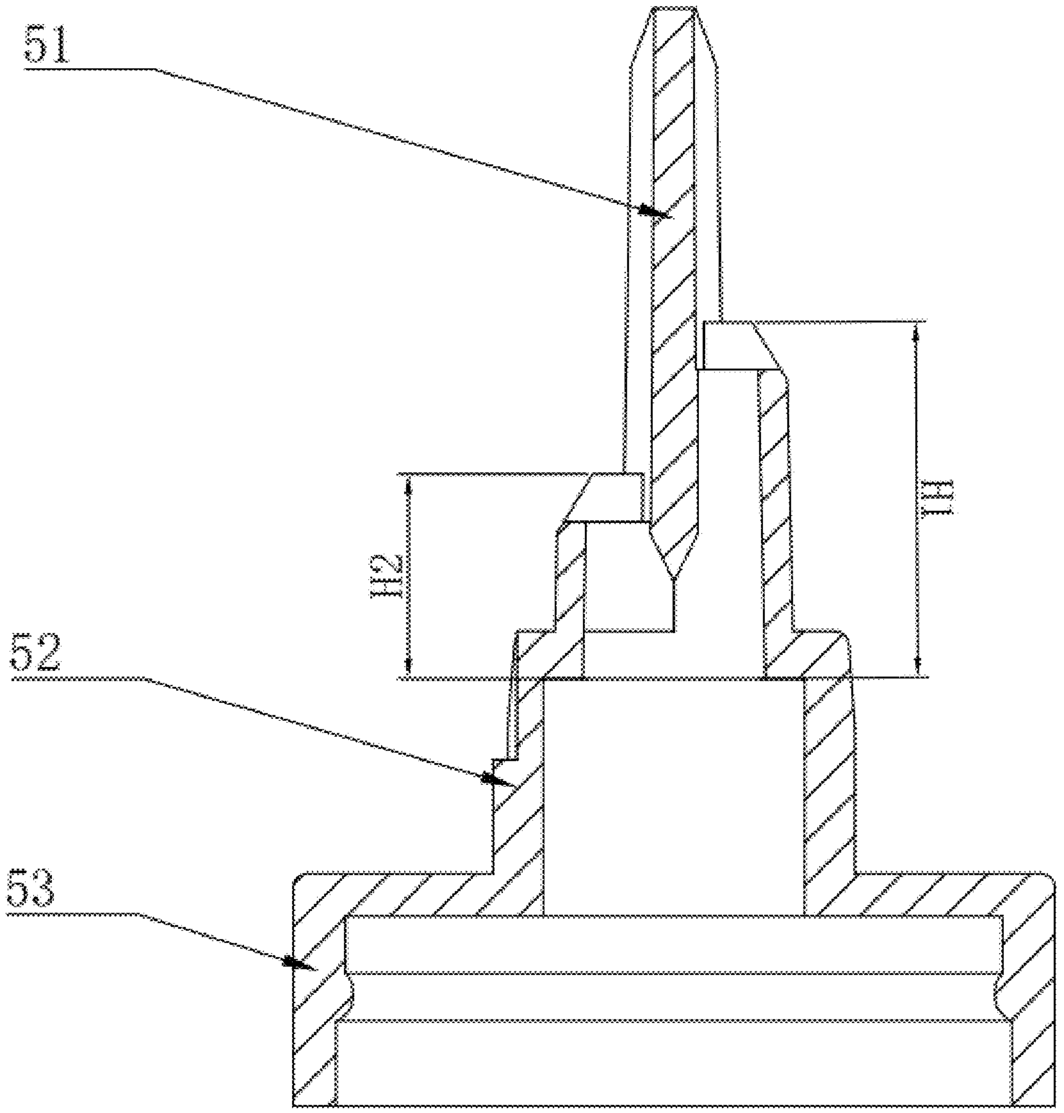
FIG. 5 is a cross-sectional structural schematic view of a fixing seat according to the present disclosure.
Figure 6:
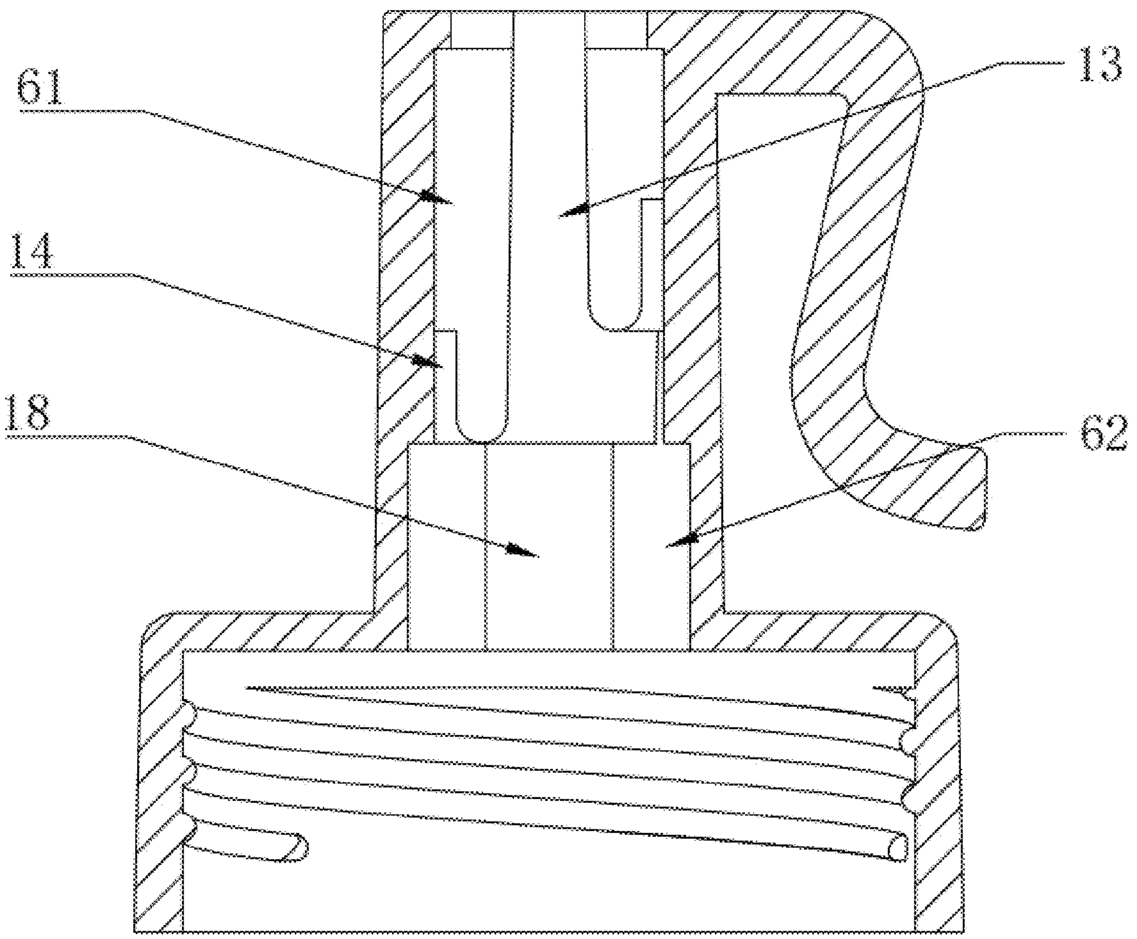
FIG. 6 is a cross-sectional structural schematic view of a lamp head shell according to the present disclosure.
Figure 7:
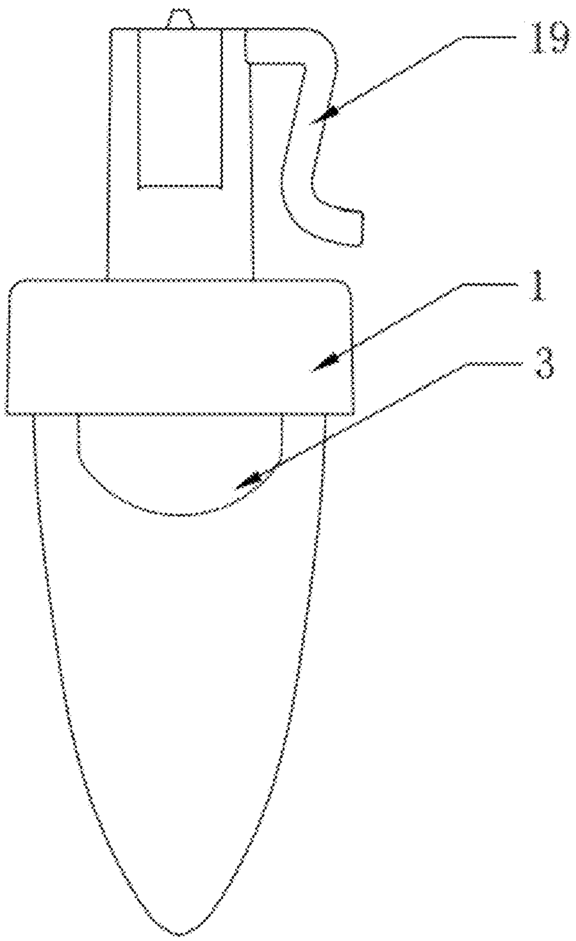
FIG. 7 is a structural schematic view of an installation lamp shell according to the present disclosure.
Figure 8:
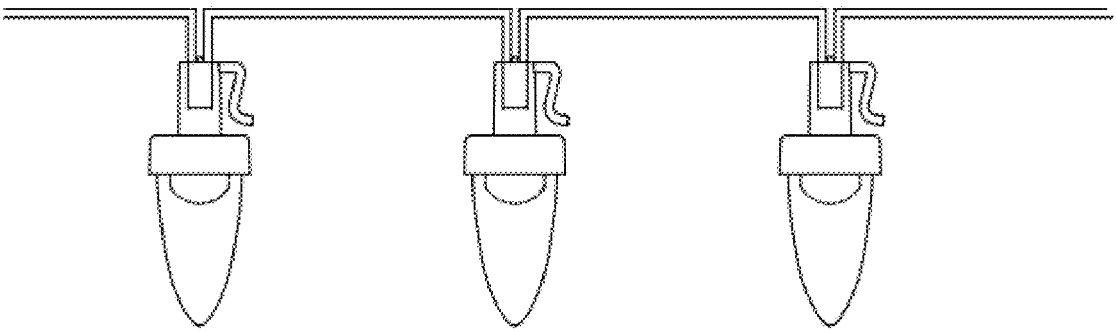
FIG. 8 is a structural schematic view a light string formed by FIG. 7 according to the present disclosure.

Reference numerals: 1, lamp head shell; 2, light-emitting inner-core assembly; 3, light-transmitting lampshade; 31, light source scattering end; 32, open end; 4, patch lamp board; 5, fixing seat; 51, first socket portion; 52, second socket portion; 53, mating portion; 6, mounting hole; 61, first chamber; 62, second chamber; 7, potting adhesive; 8, lead; 9, penetration hole; 10, hot-melt column; 11, first extension block; 12, second extension block; 13, first limit slot; 14, second limit slot; 15, conductive sheet; 16, avoidance slot; 17, positioning surface; 18, positioning groove; 19, lug; 20, internal thread.

DETAILED DESCRIPTION

The technical solutions in the embodiments of the present disclosure will be clearly described below in conjunction with the accompanying drawings in the embodiments of the present disclosure, and it is clear that the described embodiments are a part of the embodiments of the present disclosure and not all of the embodiments. Based on the embodiments in the present disclosure, all other embodiments obtained by those skilled in the art fall within the scope of the present disclosure.

Embodiment 1

This embodiment provides a lamp head for a Christmas light, including:

a lamp head shell 1, defining a mounting hole 6 for an external wire to pass through;

a light-emitting inner-core assembly 2, including a light-transmitting lampshade 3, a patch lamp board 4, and a fixing seat 5; where an end of the light-transmitting lampshade 3 is connected to the fixing seat 5, and the patch lamp board 4 is arranged inside the light-transmitting lampshade 3; the light-transmitting lampshade 3 is filled with a potting adhesive 7; the patch lamp board 4 is arranged with two leads 8, and the two leads 8 pass through the potting adhesive 7 and are threaded out from the fixing seat 5;

where the fixing seat 5 is inserted and connected in the mounting hole 6, and the two leads 8 are electrically connected to the external wire.

In this technical solution, the lamp head shell 1 may be made of UL5508 flame-retardant PP produced by Polystone Chemical, which has the advantage of high temperature resistance; the light-transmitting lampshade 3 may be made of PS material, which has good light transmittance; the lamp head shell 1 is a hollow shell and two ends of the lamp head shell 1 are in communication, and the light-emitting inner-core assembly 2 is sleeved in the lamp head shell 1.

During an installation process, the patch lamp board 4 is arranged in the light-transmitting lampshade 3, an outer peripheral edge of the patch lamp board 4 is in contact with an inner peripheral wall of the light-transmitting lampshade 3, and the potting adhesive 7 is filled into the light-transmitting lampshade to seal the patch lamp board 4, which plays a waterproof role for the patch lamp board 4. For example, when the lamp head is used in outdoor, the waterproof function may avoid leakage of electricity caused by the rain. At least one light-emitting body, preferably 4 in number, is arranged on the patch lamp board 4.

An end of the light-transmitting lampshade 3 is arranged with a curved convex ring, and the fixing seat 5 defines a ring groove. During the installation process of the light-transmitting lampshade 3, the light-transmitting lampshade 3 is pressed to make the curved convex ring snapped into the ring groove on the fixing seat 5. The patch lamp board 4 is arranged with the two leads 8, and the two leads 8 pass through the potting adhesive 7 and are threaded out from the fixing seat 5. In addition, the external wire passes through the mounting hole 6 on the lamp head shell 1, and the fixing seat 5 is inserted and connected in the mounting hole 6, such that the two leads 8 and the external wire can be electrically connected. This installation method is quick and easy, and energizing is directly realized through the plug-in method. When the fixing seat 5 is inserted and connected into the mounting hole 6, a top of the fixing seat 5 may slightly protrude out of the mounting hole 6. In this way, during a deinstallation process, an end of the fixing seat 5 protruding in the mounting hole 6 may be pushed, such that the fixing seat 5 is disengaged from the mounting hole 6; also, a tool may pass through the mounting hole 6 on the lamp head shell 1 to push against the fixing seat 5, such that the fixing seat 5 is removed. The mounting hole 6 on the lamp head shell 1 can accommodate only the fixing seat 5 and the external wire, such that water leakage is not easy to happen.

In addition, a connection between the mounting hole 6 and the external wire is filled with adhesive, for waterproofing against the light-emitting inner-core assembly 2, thereby avoiding leakage of electricity or a short-circuit.

A hanging ear 19 is further connected to an outer surface of the lamp head shell 1 for fixing the lamp head on a tree branch or other objects. An internal thread 20 may be arranged in the lamp head shell 1, the ring groove is defined between an inner wall of the lamp head shell 1 and an outer wall of the mating portion 53, and the internal thread 20 is arranged on the inner wall of the lamp head shell 1 for installing a lamp shell of the Christmas light. The lamp shell may be colorful for decorative purposes, and the light emitting is thus more beautiful. The Christmas light may be multiple lamp heads connected in series or in parallel together as a string of lights.

Embodiment 2

This embodiment provides a lamp head for a Christmas light, which has the following technical features in addition to including the technical solutions in the above embodiments.

The light-transmitting lampshade 3 includes a closed light source scattering end 31 and an open end 32 for filling with the potting adhesive 7. The patch lamp board 4 is arranged on an inner side of the light source scattering end 31. The patch lamp board 4 defines a penetration hole 9, and a hot-melt column 10 is arranged in the penetration hole 9 and abuts against the inner side of the light source scattering end 31.

In this technical solution, the light source scattering end 31 is a curved structure, which improves the structural strength of the light-transmitting lampshade 3, and makes the light dispersion more uniform. The hot-melt column 10 is configured to connect the patch lamp board 4 to the light source scattering end 31, and the hot-melt column 10 may be made of hot-melt adhesive. An end of the hot-melt column 10 may be attached to the light source scattering end 31 and in the penetration hole 9 through a heating gun to heat up the hot-melt column 10, which makes it easy to adjust the light source scattering end 31 and the penetration hole 9 after the patch lamp board 4 is fixed, thereby avoiding the patch lamp board 4 from shifting when the adhesive is filled.

Embodiment 3

This embodiment provides a lamp head for a Christmas light, which has the following technical features in addition to including the technical solutions in the above embodiments.

The fixing seat 5 includes a first socket portion 51, a second socket portion 52, and a mating portion 53 that are disposed sequentially from top to bottom, and the mating portion 53 is sleeved on the open end 32.

In this technical solution, the mating portion 53 is a ring-shaped structure. The mating portion 53 is sleeved on the open end 32. The first socket portion 51, the second socket portion 52, and the mating portion 53 are all inserted and connected in the mounting hole 6, which facilitates installation. An end of the first socket portion 51 protrudes out of the lamp head shell 1 through the mounting hole 6, such that when it is necessary to dismantle the light-emitting inner-core assembly 2, a hand or a tool may be used to push against the first socket portion 51, such that the light-emitting inner-core assembly 2 can be ejected out of the lamp.

Embodiment 4

This embodiment provides a lamp head for a Christmas light, which has the following technical features in addition to including the technical solutions in the above embodiments.

The mounting hole 6 includes a first chamber 61 adapted to the first socket portion 51, and a second chamber 62 adapted to the second socket portion 52.

In this technical solution, the first chamber 61 is configured for placing the first socket portion 51, and the second chamber 62 is configured for placing the second socket portion 52.

The first chamber 61 and the second chamber 62 are arranged in a stepwise manner, and the external wire and the two leads 8 are disclosed and connected in the first chamber 61.

Embodiment 5

This embodiment provides a lamp head for a Christmas light, which has the following technical features in addition to including the technical solutions in the above embodiments.

The first socket portion 51 is in a flat structure, and the first socket portion 51 is arranged with a first extension block 11 and a second extension block 12 for the two leads 8 to individually pass through on both sides of the first socket portion 51, and the two leads 8 are bent to outer surfaces of the first extension block 11 and the second extension block 12 after passing through and along the first extension block 11 and the second extension block 12, respectively.

In this technical solution, the first socket portion 51 is in a flat structure, and the first socket portion 51 is inserted into the mounting hole 6 after the external wire passes through the mounting hole 6. An external wire slot is defined on each of both sides of the first socket portion 51 in communication with the mounting hole 6, and the external wire is disposed in the external wire slot.

A lead hole is defined on each of the first extension block 11 and the second extension block 12, and the two lead wires 8 are penetrated through the lead holes on the first extension block 11 and the second extension block 12 through the second socket portion 52 and are bent against the outer surfaces of the first extension block 11 and the second extension block 12. There is a gap between each of the outer surfaces of the first extension block 11 and the second extension block 12 and an inside of the lamp head shell 1 to accommodate the two leads 8.

Embodiment 6

The present embodiment provides a lamp head for a Christmas light, which has the following technical features in addition to including the technical solutions in the above embodiments.

A first limit slot 13 is defined in the first chamber 61 and is adapted to snap into place with the first socket portion 51, and a second limit slot 14 is further defined in the first chamber 61 and is disposed on each of both sides of the first limit slot 13. A conductive sheet 15 is arranged in the second limit slot 14 to be connected to the external wire, and the conductive sheet 15 is configured to be electrically connected to the lead 8.

In this technical solution, the first socket portion 51 is inserted and connected into the first limit slot 13, which prevents the fixing seat 5 from rotating inside the lamp head shell 1. The second limit slot 14 is directly opposite the first extension block 11 and the second extension block 12. The conductive sheet 15 is snapped and connected inside the second limit slot 14 and is in contact with the lead 8 abutting against the outer surfaces of the first extension block 11 and the second extension block 12. The conductive sheet 15 and the external wire may be welded and fixed to form a conductive pathway. This installation method is more convenient, and the external wire is not easy to fall off.

Embodiment 7

This embodiment provides a lamp head for a Christmas light, which has the following technical features in addition to including the technical solutions in the above embodiments.

A height H1 of the first extension block 11 is greater than a height H2 of the second extension block 12.

In this technical solution, the first extension block 11 and the second extension block 12 are of different heights, which is convenient for distinguishing the positive and negative poles of the patch lamp board 4, thereby avoiding that connecting a wrong external wire to cause the lamp head not to light up.

Embodiment 8

This embodiment provides a lamp head for a Christmas light, which has the following technical features in addition to including the technical solutions in the above embodiments.

An avoidance slot 16 on the same side as the second extension block 12 is defined on an outer periphery of the second socket portion 52.

In this technical solution, the lead 8 is bent to the outer surface of the second extension block 12, and the length of the lead 8 extends to the outer periphery of the second socket portion 52. Since the second socket portion 52 is arranged inside the second chamber 62 and abuts against an inner wall of the second chamber 62, the avoidance slot 16 may provide an accommodating clearance for the extended lead 8.

Embodiment 9

This embodiment provides a lamp head for a Christmas light, which has the following technical features in addition to including the technical solutions in the above embodiments.

The second socket portion 52 has a ring-like structure, at least a positioning surface 17 is arranged on the outer periphery of the second socket portion 52, and the second chamber 62 defines a positioning groove 18 adapted to the positioning surface 17.

In this technical solution, the positioning surface 17 abuts against the positioning groove 18, such that the second socket portion 52 is snapped into the second chamber 62, which prevents the fixing seat 5 from rotating inside the lamp head shell 1, for positioning the fixing seat 5 and ensuring that the positive and negative poles are wired accurately.

Embodiment 10

This embodiment provides a lamp head for a Christmas light, which has the following technical features in addition to including the technical solutions in the above embodiments.

A production process of a lamp head for a Christmas light, including the following steps:

I. preparing a light-emitting inner-core assembly 2:

a, pre-injection molding a light-transmitting lampshade 3 and a fixing seat 5, where the light-transmitting lampshade 3 is made of PS material;

b. defining a penetration hole 9 in the center of the patch lamp board 4 and installing a hot-melt column 10;

c, placing the patch lamp board 4 arranged with the hot-melt column 10 inside a chamber of the light-transmitting lampshade 3, and making a peripheral edge of the patch lamp board 4 in contact with a peripheral wall inside the chamber of the light-transmitting lampshade 3, and making an end of the hot-melt column 10 in contact with an inner wall of the light source scattering end 31 of the light-transmitting lampshade 3;

d, heating the hot-melt column 10 by a heating gun, for making two ends of the heated hot-melt column 10 hot-melt connected with the patch lamp plate and the light transmissive lampshade 3, respectively;

e, after cooling, aligning, by a filling equipment, a filling gun with the open end 32 of the light-transmitting lampshade 3 and injecting a filling adhesive 7, and leading a lead 8 on the patch lamp board 4 out from the filling adhesive 7;

f, natural cooling and curing, assembling with the fixing seat 5;

II, pre-injection molding a lamp head shell 1, and installing the light-emitting inner-core assembly 2 in the lamp head shell 1.

The molding method is simple and has good structural stability and good sealing.

The embodiments of the present disclosure are described above in conjunction with the accompanying drawings, and the embodiments and features in the embodiments in the present disclosure can be combined with each other without conflict. The present disclosure is not limited to the specific embodiments described above, and the specific embodiments above are merely schematic and are not limiting. Those skilled in the art, under the inspiration of the present disclosure, can make many forms without departing from the scope of the purpose and claims of the present disclosure, all of which belong to the scope of the present disclosure.

What is claimed is:

1. A lamp head for a Christmas light, comprising:

a lamp head shell (1), defining a mounting hole (6) for an external wire to pass through;

a light-emitting inner-core assembly (2), comprising a light-transmitting lampshade (3), a patch lamp board (4), and a fixing seat (5); wherein an end of the light-transmitting lampshade (3) is connected to the fixing seat (5), and the patch lamp board (4) is arranged inside the light-transmitting lampshade (3); the light-transmitting lampshade (3) is filled with a potting adhesive (7); the patch lamp board (4) is arranged with two leads (8), and the two leads (8) pass through the potting adhesive (7) and are threaded out from the fixing seat (5);

wherein the fixing seat (5) is inserted and connected in the mounting hole (6), and the two leads (8) are electrically connected to the external wire;

wherein the light-transmitting lampshade (3) comprises a closed light source scattering end (31) and an open end (32) for filling with the potting adhesive (7); the patch lamp board (4) is arranged on an inner side of the light source scattering end (31); the patch lamp board (4) defines a penetration hole (9), and a hot-melt column (10) is arranged in the penetration hole (9) and abuts against the inner side of the light source scattering end (31).

2. The lamp head according to claim 1, wherein the fixing seat (5) comprises a first socket portion (51), a second socket portion (52), and a mating portion (53) that are disposed sequentially from top to bottom, and the mating portion (53) is sleeved on the open end (32).

3. The lamp head according to claim 2, wherein the mounting hole (6) comprises a first chamber (61) adapted to the first socket portion (51), and a second chamber (62) adapted to the second socket portion (52).

4. The lamp head according to claim 2, wherein the first socket portion (51) is in a flat structure, and the first socket portion (51) is arranged with a first extension block (11) and a second extension block (12) for the two leads (8) to individually pass through, the first extension block (11) being disposed on a side of the first socket portion (51) and the second extension block (12) being disposed on another side of the first socket portion (51); one of the two leads (8) is bent to an outer surface of the first extension block (11) after passing through and along the first extension block (11), and the other of the two leads (8) is bent to an outer surface of the second extension block (11) after passing through and along the second extension block (12).

5. The lamp head according to claim 3, wherein a first limit slot (13) is defined in the first chamber (61) and is adapted to snap into place with the first socket portion (51), and a second limit slot (14) is further defined in the first chamber (61) and is disposed on each of both sides of the first limit slot (13); a conductive sheet (15) is arranged in the second limit slot (14) to be connected to the external wire, and the conductive sheet (15) is configured to be electrically connected to a corresponding lead (8).

6. The lamp head according to claim 4, wherein a height H1 of the first extension block (11) is greater than a height H2 of the second extension block (12).

7. The lamp head according to claim 4, wherein an avoidance slot (16) on a same side as the second extension block (12) is defined on an outer periphery of the second socket portion (52).

8. The lamp head according to claim 3, wherein the second socket portion (52) has a ring-like structure, at least one positioning surface (17) is arranged on an outer periphery of the second socket portion (52), and the second chamber (62) defines a positioning groove (18) adapted to each of the at least one positioning surface (17).

9. A production process of the lamp head according to claim 1, comprising:

I. preparing the light-emitting inner-core assembly (2):
- a, pre-injection molding the light-transmitting lampshade (3) and the fixing seat (5), wherein the light-transmitting lampshade (3) is made of PS material;
- b. defining the penetration hole (9) in a center of the patch lamp board (4) and installing the hot-melt column (10);
- c, placing the patch lamp board (4) arranged with the hot-melt column (10) inside a chamber of the light-transmitting lampshade (3), and making a peripheral edge of the patch lamp board (4) in contact with a peripheral wall inside the chamber of the light-transmitting lampshade (3), and making an end of the hot-melt column (10) in contact with an inner wall of the light source scattering end (31) of the light-transmitting lampshade (3);
- d, heating the hot-melt column (10) by a heating gun, for making two ends of the heated hot-melt column (10) hot-melt connected with the patch lamp plate and the light transmissive lampshade (3), respectively;
- e, after cooling, aligning, by a filling equipment, a filling gun with the open end (32) of the light-transmitting lampshade (3) and injecting the filling adhesive (7), and leading the two leads (8) on the patch lamp board (4) out from the filling adhesive (7); and
- f, natural cooling and curing, assembling with the fixing seat (5); and II, pre-injection molding the lamp head shell (1), and installing the light-emitting inner-core assembly (2) in the lamp head shell (1).

* * * * *